May 4, 1954 A. DAVISON ET AL 2,677,768
IMPULSE PATTERN GENERATOR
Filed Sept. 11, 1950
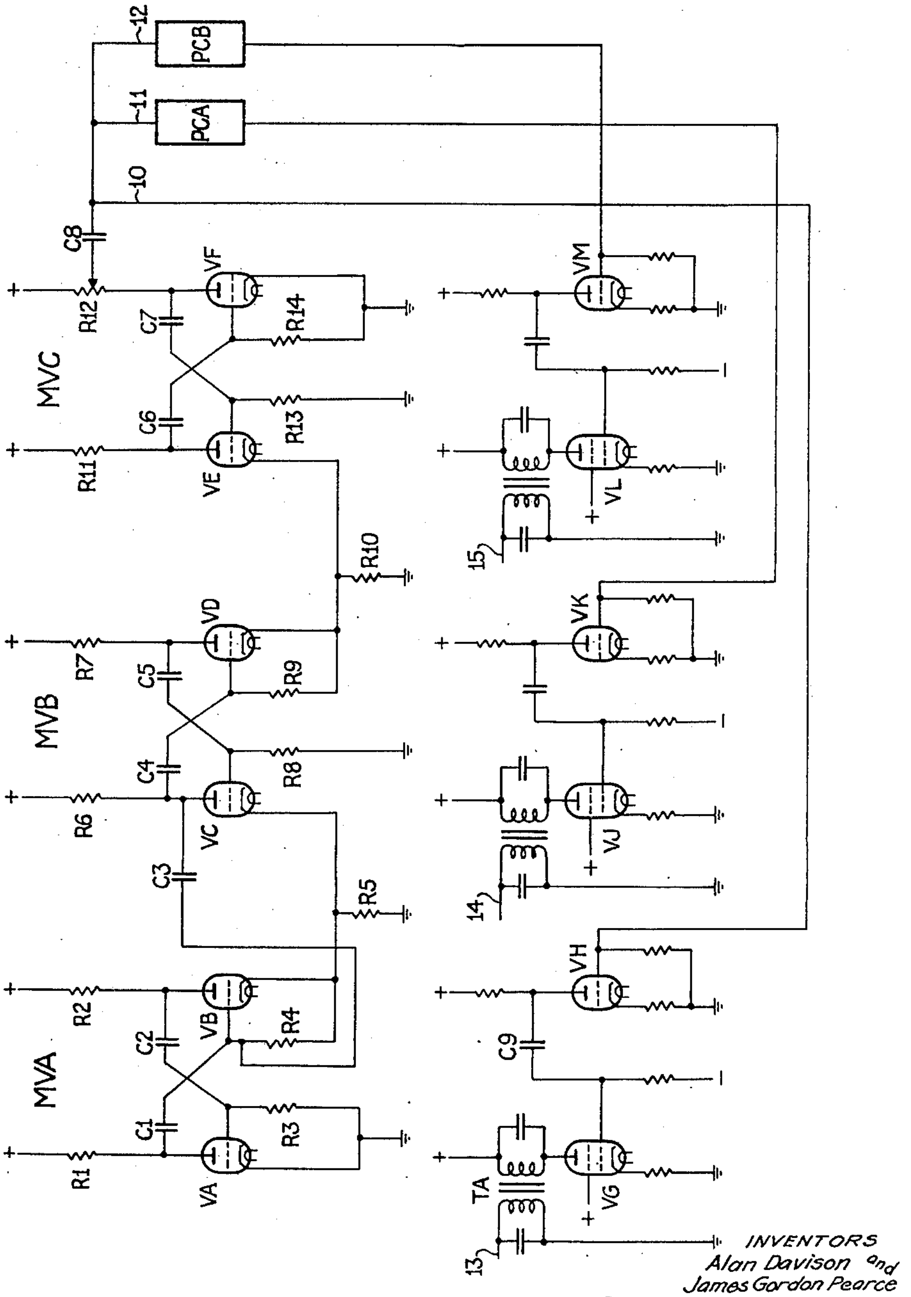
INVENTORS
Alan Davison and
James Gordon Pearce
By
Lippincott & Smith.
ATTORNEYS Patented May 4, 1954 2,677,768

UNITED STATES PATENT OFFICE 2,677,768

IMPULSE PATTERN GENERATOR

Alan Davison and James Gordon Pearce, Liverpool, England, assignors to Automatic Telephone & Electric Company Limited, Liverpool, England, a British company Application September 11, 1950, Serial No. 184,184

Claims priority, application Great Britain October 11, 1949

9 Claims. (Cl. 250—36)

The present invention relates to circuit arrangements for generating an impulse pattern at a given recurrence frequency and while it has particular application to the generation of signals such as are used in telephone systems, it is capable of wider application.

Previously when generating signals of this type, which comprise an interrupted alternating current the interruptions have been effected by means of cam-operated contacts, relays timed by electronic circuits or other mechanical or electro-mechanical devices. It is an object of the present invention to provide means for generating such signals electronically so as to obviate the need for mechanical switching.

According to one feature of the invention, in circuit arrangements for generating an impulse pattern at a given recurrence frequency a first multivibrator circuit operating at the given recurrence frequency controls the operation of a second multivibrator circuit having a higher recurrence frequency, said control being effected by a biasing voltage which is applied in one of the alternative conditions of said first circuit to said second circuit to terminate the impulse pattern and to prevent the operation of said second circuit while said first circuit is in said condition.

According to another feature of the invention in circuit arrangements for generating an impulse pattern at a given recurrence frequency a first multivibrator circuit operating at a given recurrence frequency controls by means of a D. C. circuit the operation of a second multivibrator circuit having a higher recurrence frequency while synchronization between said two circuits is effected by an A. C. circuit extending from said second to said first circuit.

According to a further feature of the invention, circuit arrangements for generating a pattern of alternating current impulses at a given recurrence frequency comprises a source of oscillations of signal frequency, a multivibrator circuit for controlling said source to emit said impulse pattern, a second multivibrator circuit having a lower recurrence frequency than said first circuit and controlling said first circuit to determine the recurrence frequency of said impulse pattern and synchronising means between said first and second multivibrator circuits.

The invention will be better understood from the following description of one method of carrying it into effect, which illustrates its application to the generation of ringing potentials used in telephone systems, and which should be read in conjunction with the accompanying drawing.

MVC is a multivibrator arranged to oscillate symmetrically at 16⅔ C./S. Multivibrator MVB oscillates asymmetrically, the component values being arranged so that tube VD conducts for 0.2 second and tube VC conducts for 0.4 second. When tube VD conducts, current flows through resistors R10 and its upper end is made positive with respect to earth. Consequently the potential of the cathode of tube VE is raised to bias the tube beyond cut-off. Hence while tube VD is drawing current the oscillations of multivibrator MVC are interrupted. When tube VC conducts and tube VD is driven beyond cut-off, no current flows in resistor R10 and the cathode of tube VE assumes earth potential to allow the tube to take current.

Multivibrator MVA is also asymmetrical and it is arranged that tube VA conducts for one second and tube VB conducts for two seconds. When tube VB is conducting, tube VC is biassed beyond cut-off by the current flowing in resistor R5.

It will be seen that multivibrator MVB is inoperative for two seconds and operative for one second, during which time it will allow multivibrator MVC to oscillate for two 0.4 second periods separated by 0.2 second. The output from the multivibrator circuit is derived from the anode resistor R12 of tube VF as shown, and consists of a 16⅔ C./S. signal following the cycle: 0.4 second on; 0.2 second off; 0.4 second on; 2 seconds off, etc.

In order to maintain this periodicity it is essential that tube VC conducts for two full periods of 0.4 second during each one second period when tube VB is non-conducting. Since it is not possible to adjust the time constants of the two multivibrator circuits for the synchronism to remain perfect it is necessary to arrange for the two circuits to be interlocked. This is effected according to the invention by connecting the anode of tube VC via a capacitor to the grid of tube VB. Each time the grid of tube VC is biassed beyond cut-off, current ceases to flow in anode resistor R6 and the potential at the anode rises. While the potential at this point is rising, a rising potential will also be applied to the grid of tube VB via capacitor C3, and at the same time the potential of the cathode of tube VB is reduced since current no longer flows in resistor R5. The first positive-going pulse is applied to the grid of tube VB 0.4 second after it has received a much larger negative-going pulse from the anode of tube VA, and consequently the negative charge on the grid of tube VB has not leaked away sufficiently for the first positive-going pulse to drive the tube to a conducting state. The negative-going pulse received from the anode of tube VC 0.2 second later when tube VC begins to conduct, substantially neutralises the effect of the previous positive-going pulse. The second positive-going pulse, transmitted when tube VD begins to conduct, is applied to the grid of tube VB when the potential of the grid has risen almost to cut-off value, and this pulse, together with the sudden fall in potential of the cathode as resistor R5 stops passing current, raises the potential of the grid of tube VB to a value sufficiently high to cause the tube to conduct. It is arranged that the normal leakage time of the capacitor C1 through resistors R1, R4 and R5 is slightly longer than one second so as to eliminate the possibility of tube VB beginning to conduct before the 2nd 0.4 second operation of tube VC is complete, and thus cutting off the end of the second signal in each cycle.

Since multivibrator MVA determines the cycle period of the output signal and controls the operation of both multivibrators MVB and MVC, its periodicity must be made to remain constant. In order to eliminate the possibility of the tube VB being triggered through its common cathode circuit with tube VC, it is arranged that tube VB shall draw considerably more current than tube VC when they are in their respective conducting states.

For installation in existing exchanges, the ringing generator preferably has three outputs. The signal is fed from the potentiometer R12 via capacitor C8 and leads 10, 11 and 12 to three amplifiers involving tubes VH, VK and VM. These feed the three power output tubes VG, VJ and VL respectively and the load circuits are transformer coupled. The output tubes are run in class C to reduce the power consumed, and in order to prevent these three tubes taking maximum current simultaneously, phase changing networks PCA and PCB may be introduced in leads 11 and 12. These would be arranged to provide a 120° phase difference in the inputs to the three amplifiers, and consequently the outputs at leads 13, 14 and 15 would also be separated by 120°.

It will be understood that while the operation of the multivibrators MVB and MVC is somewhat similar to that of MVA and MVB in that MVC oscillates during the time that VD is cut off, the multivibrators MVB and MVC need not be synchronised in the same manner as MVA and MVB since the frequency of oscillation of MVC is considerably greater than that of MVB and, for the generation of ringing potentials, lack of synchronism makes little noticeable difference. However the invention should not be regarded as limited to the case where only the first two stages are synchronised as it is possible that conditions may arise where it is desirable for all three stages to be synchronised.

It will be understood that the invention may also be used for the generation of other signals, such as busy tone, in which case two stages only would be employed, namely the second and third. Further, for the generation of D. C. telegraph signals using, say, a five-unit code, the first two stages only are employed. In the case of V. F. telegraph transmission, however, all three stages would be employed.

The circuit may also be employed for key-sending purposes in automatic telephone systems, the operation of a key serving to connect up the appropriately valued capacitor corresponding to C1 in multivibrator MVA in order to vary the recurrence frequency of MVA to enable MVB to generate the required number of pulses.

It will also be understood that a source of oscillations of the signal frequency other than the multivibrator MVC may be used. This multivibrator is suitable for some purposes by owing to the square shape of the output waveform there are circumstances where it is desirable to employ a conventional oscillator, for instance, of the RC type. In this case the preferred arrangement would be for the oscillator to operate continuously, the output being fed to an amplifier which switches on the control grid by the voltage developed across R10.

It will of course, be appreciated that more than two stages of control multivibrators may be used. This would for instance be desirable if the signal comprised irregularly spaced pulses or trains of pulses.

The invention is not limited to the specific arrangements described above, nor to its application to ringing current generators in telephone exchanges. It has many applications in the signalling field, particularly to the generation of coded alternating current signals in telephony and telegraphy, in signalling and remote switching over power mains, telemetering and the like.

We claim:

1. Circuit arrangements for generating an impulse pattern consisting of groups of impulses repeated at a predetermined frequency comprising a first relaxation circuit including first and second thermionic tubes interconnected to cause said first relaxation circuit to have two unstable conditions of equilibrium, a second relaxation circuit including third and four thermionic tubes interconnected to cause said second relaxation circuit to have two unstable conditions of equilibrium and a cathode resistor common to said second and third thermionic tubes.

2. Circuit arrangements as claimed in claim 1 and including an alternating current coupling circuit between the anode of said third thermionic tube and the control grid of said second thermionic tube.

3. Circuit arrangements as claimed in claim 1 comprising in addition means to establish a current flow in said first and second thermionic tubes when conducting in excess of that normally flowing in the said third and fourth thermionic tubes.

4. Circuit arrangements for generating an impulse pattern consisting of groups of impulses repeated at a predetermined frequency comprising a first multivibrator circuit for generating said impulses, a second multivibrator circuit having a lower recurrence frequency then said first multivibrator circuit, a direct current circuit extending between said first and second multivibrator circuits and means in said second multivibrator circuit effective when said second multivibrator circuit is in one condition of unstable equilibrium for exerting a control on said first multivibrator circuit over said D. C. circuit to prevent the operation of said first multivibrator circuit while said second multivibrator circuit is in said condition of unstable equilibrium.

5. Circuit arrangements as claimed in claim 4 comprising in addition an alternating current circuit extending between said first and second multivibrator circuits to enable the operation of said second multivibrator to be synchronized from said first multivibrator circuit.

6. Circuit arrangements for generating an impulse pattern consisting of groups of impulses of alternating current repeated at a predetermined frequency comprising a source of oscillations of the frequency of said alternating current, a first multivibrator circuit interconnected therewith for preventing the operation of said source when said first multivibrator circuit is in one unstable condition of equilibrium to cause said source to emit impulses of alternating current, a second multivibrator circuit having a lower recurrence frequency than said first multivibrator circuit interconnected with said first multivibrator circuit, means in said second multivibrator circuit for preventing the operation of said first multivibrator circuit when said second multivibrator circuit is in one position of unstable equilibirum to cause said source to emit said impulses in groups to form said impulse pattern and a circuit extending between said first and second multivibrator circuits for synchronizing said second multivibrator circuit from said first multivibrator circuit.

7. Circuit arrangements as claimed in claim 6 wherein said source of oscillations comprises a third multivibrator circuit.

8. Circuit arrangements for generating ringing current in a telephone system comprising a symmetrical multivibrator circuit for generating alternating current of ringing frequency, a first asymmetric multivibrator circuit for controlling said symmetrical multivibrator to emit alternating current impulses having a recurrence frequency determined by said first asymmetric multivibrator circuit and a second asymmetric multivibrator circuit for controlling said first asymmetric multivibrator circuit to enable said alternating current impulses to be emitted in groups, the recurrence frequency of said groups being determined by said second asymmetric multivibrator circuit.

9. Circuit arrangements as claimed in claim 8 wherein said symmetrical multivibrator has $n$ output circuits, an amplifier connected in each output circuit, and a phase changing circuit interposed in $n-1$ of the output circuits where $n$ is an integer greater than unity.

References Cited in the file of this patent

UNITED STATES PATENTS

| Number | Name | Date |
|---|---|---|
| 2,390,608 | Miller et al. | Dec. 11, 1945 |
| 2,540,539 | Moore | Feb. 6, 1951 |
| 2,569,827 | Paulsen | Oct. 2, 1951 |